United States Patent
Rhoden et al.

[11] Patent Number: 6,008,823
[45] Date of Patent: Dec. 28, 1999

[54] METHOD AND APPARATUS FOR ENHANCING ACCESS TO A SHARED MEMORY

[76] Inventors: Desi Rhoden, 3412 E. Suncrest Ct., Phoenix, Ariz. 85044; Judson Alan Lehman, 12402 N. 64th St., Scottsdale, Ariz. 85254; Mike Nakahara, 10818 111th Ct. NE #0-208, Kirkland, Wash. 98033

[21] Appl. No.: 08/510,076

[22] Filed: Aug. 1, 1995

[51] Int. Cl.[6] ..................................... G06F 13/16
[52] U.S. Cl. .......................... 345/521; 345/517; 345/512
[58] Field of Search ..................... 345/520, 521, 345/507, 188, 516, 517, 512; 711/5, 6, 104, 105, 147–153, 154, 157, 158, 167, 168, 169; 395/823, 872–874, 859–861; 710/52, 53, 54

[56] References Cited

U.S. PATENT DOCUMENTS

| | | | |
|---|---|---|---|
| 5,454,107 | 9/1995 | Lehman et al. .......................... | 345/433 |
| 5,572,467 | 11/1996 | Ghassemi et al. ................. | 365/189.02 |
| 5,594,882 | 1/1997 | Bell .......................................... | 711/212 |
| 5,600,605 | 2/1997 | Schaefer .................................. | 365/233 |
| 5,602,781 | 2/1997 | Isobe .................................. | 365/189.05 |
| 5,630,096 | 5/1997 | Zuravleff et al. ....................... | 711/154 |
| 5,638,534 | 6/1997 | Mote, Jr. ................................ | 711/158 |
| 5,657,055 | 8/1997 | Kansel et al. ........................... | 345/507 |
| 5,701,433 | 12/1997 | Moriarty et al. ....................... | 711/154 |
| 5,715,437 | 2/1998 | Baker et al. ............................ | 345/202 |

OTHER PUBLICATIONS

"Cache and Memory Design Considerations for the Intel486™ DX2 Microprocessor", Taufik T. MA, ©1991 Intel Corporation, Order No. 241261–001, Jan. 1992, Revision 0.2, p. 25.

*Primary Examiner*—Ulka J. Chauhan
*Attorney, Agent, or Firm*—Burns, Doane, Swecker & Mathis, L.L.P.

[57] ABSTRACT

The present invention is directed to providing an organized memory which is accessed by multiple memory controllers while still exploiting the efficiencies which the organized memory was intended to provide. In accordance with exemplary embodiments, optimal efficiency in using the shared memory is achieved by buffering memory accesses which will not increase overhead during a memory write cycle. As a result, interruptions by one controller while another controller is accessing the shared memory are reduced to a minimum.

20 Claims, 2 Drawing Sheets

METHOD AND APPARATUS FOR ENHANCING ACCESS TO A SHARED MEMORY

BACKGROUND OF THE INVENTION

1. Field of the Invention

The present invention relates generally to controlling access to a memory which is shared by multiple controllers, such as a memory shared by a graphics controller and a system controller.

2. State of the Art

As memories become increasingly more dense, memory control required to efficiently use memory space has become more sophisticated. For example, a document entitled "Cache and Memory Design Considerations For The Intel 486™ DX2 Microprocessor", by Taufik T. Ma dated January, 1992, describes the use of a paged memory system wherein storage areas of the memory are divided into separate pages. As described in the Ma document, data is formed into double words, or "Dwords", which can each consist of, for example, 32 bits. In a memory formed with 512 rows and 512 columns, each row can be considered a page of the memory for storing multiple Dwords.

A paged memory system allows for enhanced speed in back-to-back read or write cycles. Back-to-back cycles occur when multiple accesses to the memory are made, with sequential storage areas in the memory being written during consecutive access cycles. To realize the benefits associated with organized memories, access to these memories has been limited to a single memory controller. Organized memories have not been used as shared memories, because any arbitration scheme used to arbitrate memory access among multiple controllers would undermine the efficiencies which the organized memory was created to provide.

Accordingly, it would be desirable to use an organized memory, such as a paged memory, as a shared memory which can be accessed by multiple controllers. In so doing, it would be desirable to assign each of the controllers a hierarchical priority in accessing the memory without detrimentally affecting the efficiencies associated with the use of an organized memory.

SUMMARY OF THE INVENTION

The present invention is directed to providing an organized memory which is accessed by multiple memory controllers while still exploiting the efficiencies which the organized memory was intended to provide. In accordance with exemplary embodiments, optimal efficiency in using the shared memory is achieved by buffering memory accesses which will not increase overhead during a memory write cycle. As a result, interruptions by one controller while another controller is accessing the shared memory are reduced to a minimum.

For example, in a shared memory which is organized into pages, where each page corresponds to one row of the memory, multiple memory accesses to a given page can be grouped in a buffer and written during a single write cycle. By grouping the access cycles associated with a given page of the memory, interruptions among the multiple controllers having access to the shared memory are reduced to a minimum. However, the grouping of memory accesses for the same page into a single access does not significantly affect memory overhead. On the contrary, by grouping multiple accesses to the same page into a single access cycle, only a single precharge is necessary for the row of the memory associated with that page. In other words, overhead is not significantly increased by conducting multiple memory accesses associated with a single page during a single memory access cycle.

Generally speaking, exemplary embodiments of the present invention are directed to a method and apparatus for controlling access to a memory with an apparatus that includes means for comparing at least a portion of an address (e.g., page and/or column of the memory) of at least a first memory access and a second access memory; means for storing said portions of said address of said first memory access; means for buffering data of said first and second memory accesses determined by said comparing means to include said at least a portion of said address; and means for transferring said buffered data to said memory in a single access cycle of said memory.

Further, exemplary embodiments of the present invention are directed to a method and apparatus for controlling access to a memory comprising the steps of receiving a first memory access, said first memory access including a first memory address and first data; storing said first memory address in a first address register and storing said first data in a first memory buffer; receiving a second memory access, said second memory access including a second memory address and second data; comparing said first memory address and said second memory address; and storing said second data in said first memory buffer when at least a predetermined portion (e.g., a page and/or column of the memory) of said first memory address matches said second memory address.

Further, exemplary embodiments of the present invention relate to a method and apparatus for accessing a memory comprising a first controller having a first priority for accessing the memory; a second controller having a second priority for accessing the memory, said second priority being higher than said first priority; and means for splicing data of plural memory accesses by at least one of said first controller and said second controller into a single memory access.

Those skilled in the art will appreciate that exemplary embodiments can be used with both a synchronous memory as well as an asynchronous memory. For example, with a synchronous memory, multiple memory accesses to consecutive column locations in a given page can be grouped and written during a single write cycle. Such a feature enables enhanced writing of data to memory during blocks of memory access operations (such as known blit and burst operations) associated with the updating of a graphics display by moving an image from one location in a display frame buffer to another location in the display frame buffer.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
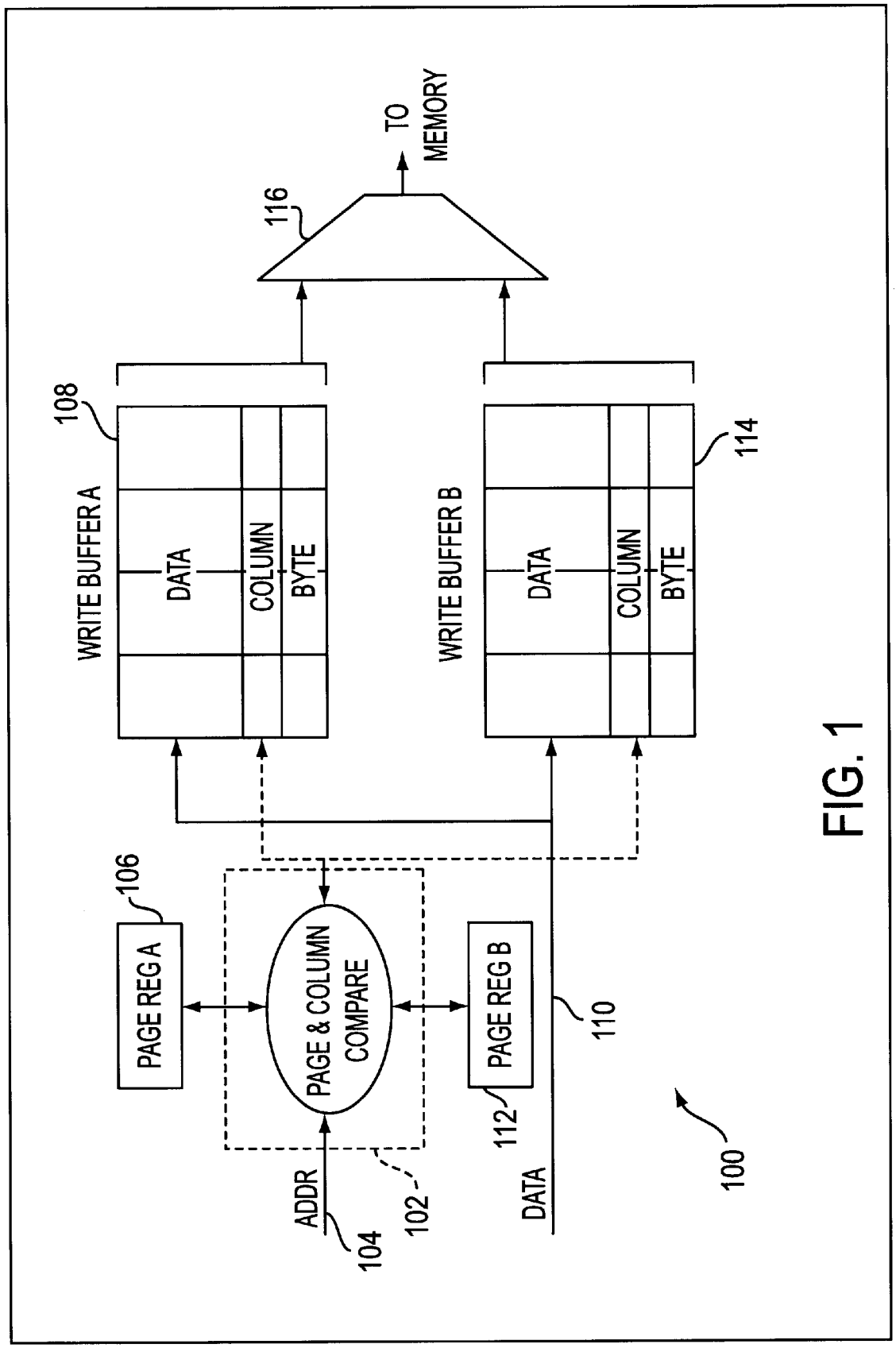
FIG. 1 illustrates an exemplary embodiment of an apparatus for controlling access to a shared memory in accordance with the present invention.

FIG. 1 illustrates an exemplary embodiment of an apparatus, represented as memory access control device 100, for controlling access to a shared memory. Where the shared memory is configured as a paged memory system, the storage areas can be divided into separate pages. For example, a page can correspond to a given row in memory, such that the page address corresponds to a row address of the first memory access. Device 100 includes means, represented as a memory controller 102, for comparing at least a portion of an address of at least a first memory access and a second memory access. Memory controller 102 receives address information of an input data packet via an address input line 104.

The first address information of an input data packet is received via address input line 104. At least a portion of the address information associated with the input data packet is placed into a means for storing. The stored portion of the address (which can include any or all of the address) is placed by the memory controller 102 in register 106 before being transferred in the shared memory.

At the same time the page address information of the first input data packet is stored in the register 106, data received in the input data packet is stored in a means for buffering data of plural memory accesses, represented in the exemplary FIG. 1 embodiment as a write buffer 108. The data is written into write buffer 108 via data bus 110. In accordance with exemplary embodiments, only data is stored in the write buffer 108, since address information associated with the data has been previously stored in the register 106.

When a second input data packet is received via the address input bus 104, the memory controller 102 compares at least a portion of an address of the first memory access (i,e., page address information) stored in the register 106 with that of a second memory access. In the exemplary embodiment described above, the memory controller can compare a row address of the first memory access with a row address of the second memory access, since a row in the memory corresponds to a page of the memory.

Where the page information of the second memory access matches that of the first memory access, there is no need to store the address information of the second memory access in the register 106. However, data associated with the second memory access is stored in the write buffer 108 with the data of the first memory access since both correspond to the same page memory and can be written into consecutive memory locations. Where data is formed as 32 bit double words, the data bus 110 can, for example, be a 32 bit data bus. However, those skilled in the art will appreciate that any data bus size necessary to accommodate a given configuration, with speed and cost considerations taken into account, can be used. For example, if data is transferred within the FIG. 1 system as 8 bit words, then an 8 bit data bus would be sufficient.

Those skilled in the art will appreciate that the write buffer 108 can be configured of any size. However, in accordance with exemplary embodiments, the write buffer can be configured in a manner which will enhance system efficiency if its size is chosen to accommodate other system constraints. For example, in a graphics environment where one or more caches are typically included in the overall system, system writes to the shared memory can be buffered using FIG. 1 system, and then written during a single access to the shared memory when the cache is determined to be full.

With such a system configuration, the write buffer 108 can include a number of storage locations comparable to that of the largest system cache. Thus, the entire contents of any cache in the system can be stored in the write buffer 108 and then loaded into a single page of memory during a single memory access. However, this example is by way of illustration only and those skilled in the art will appreciate that the write buffer can be configured with any desired size.

When multiple input data packets are received by the memory controller 102, and are to be stored in the same page of memory, data associated with the multiple input data packets can continue to be stored in the write buffer 108. Storage in the write buffer 108 can continue until, for example, the write buffer is full.

Alternately, a transfer to the shared memory can occur from among the write buffers whenever a read operation is to be performed, so that the read operation will have the benefit of accessing all data which should have been previously written to memory. Of course, a comparison of the shared memory page for the read operation can be compared with the page address or addresses having data buffered in the registers 108 and 114 to determine in advance whether a write to the stored memory is necessary before the read operation is performed. The write buffer can also be downloaded to the memory at predetermined, periodic intervals, or upon receipt of a subsequent input data packet where the address information does not match the address information stored in the register 106.

More particularly, when a subsequent input data packet is received having address information which does not correspond to that of register 106, the memory controller 102 determines that the address information of the most currently received input data packet does not match that of register 106. Because the address information of the currently received input data packet does not match that stored in the first register 106, the address information is stored in a second register 112. Data associated with the most recently received memory access is therefore not stored in the write buffer 108, but rather is stored in a second write buffer 114.

As mentioned previously, because the most recently received input data packet does not include data that is to be written to the same page memory as data stored in the first write buffer 108, the receipt of this most recently received input data packet can be used as a trigger to download data stored in the write buffer 108 to the shared memory. A downloading of information stored in either the write buffer 108 or the second write buffer 114 to the memory can be performed via a means for transferring buffered data of plural memory accesses to the memory in a single access cycle. To allow for data to be downloaded to memory from either the write buffer 108 or the write buffer 114, the transferring means can include a multiplexer 116 which is connected to the shared memory wherein data is to be ultimately stored.

Because data stored in either the write buffer 108 or the write buffer 114 corresponds to a single page in the memory, such data can be transferred to the memory in a single write access cycle. For example, in a paged memory system wherein each page corresponds to one row of the memory, the entire row can be precharged at the time a write access is to occur.

By precharging the entire row, data from the entire write buffer 108 or the write buffer 114 can be loaded in parallel to that row with minimal time cost. That is, by writing the multiple data packets to the shared memory in parallel, the time required for the write access is not significantly increased relative to the access time required for a single data packet. Alternately, those skilled in the art will appreciate that a serial writing or reading of information to or from the shared memory can be performed. Again, because an entire row of the shared memory can be precharged at a single time for the serial read or write, the overhead costs and efficiency with which multiple data packets are read or written to the shared memory are not significantly degraded since the multiple precharges associated with writing the plural data packets individually to the shared memory are avoided.

Thus, the time which would have been required to precharge at least a portion of the row for transferring data associated with a single data packet, followed by a separate precharge for the data of each subsequent data packet that is to be written to the same page, is eliminated. Rather, multiple data packets associated with a given page are buffered and then transferred to memory in a single write access. Because less access cycles to the memory are performed, interruptions by higher priority controllers in the system are reduced to a minimum.

Those skilled in the art will appreciate that exemplary embodiments of the present invention can substantially enhance write access to a memory which is either a synchronous or asynchronous type. Where the memory is of a synchronous type, the memory controller 102 can further compare a column address of a first memory access with a column address of a second memory access. Where multiple input data packets include data that is associated with a single page in memory, and associated with consecutive columns in that page, synchronous writing to the memory can be enhanced. That is, all consecutive columns in a given page of memory can be buffered in either a write buffer 108 or write buffer 114, and then subsequently transferred to memory during a single write access to the memory. Thus, synchronism in writing to the shared memory is not lost, yet efficiency is improved since the number of interruptions among controllers during multiple writes to the shared memory is significantly reduced.

Those skilled in the art will appreciate that while the above configuration has been described with respect to first and second registers for storing row addresses that correspond to pages in memory, any number of such registers can be included for buffering data associated with input data packets having like page addresses. For example, a register can be established for each page in memory, and whenever an input data packet is received, data associated with that packet can be routed to the appropriate write buffer. Data transfers from each given write buffer to the shared memory can then be performed whenever a given buffer becomes full. Thus, each write buffer will store all data associated with input data packets having matching page addresses, and possibly with sequential column addresses.

Figure 2:
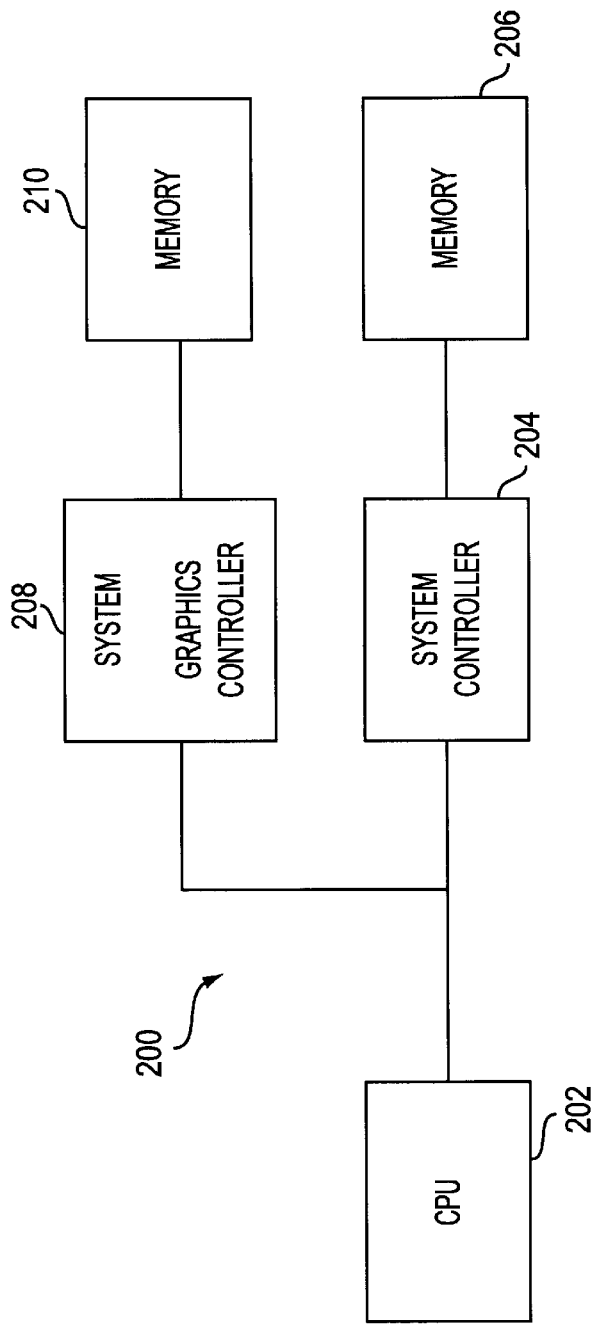
FIG. 2 illustrates an exemplary system having a shared memory accessible by multiple controllers.

To illustrate the significant advantages which can be achieved in accordance with exemplary embodiments of the present invention, reference is made to FIG. 2 wherein a system having a shared memory is illustrated. In the FIG. 2 system 200, first and second controllers having heirachical priorities for accessing a shared memory are illustrated. For example, the first controller can be a main central processing unit (CPU) 202. A system controller 204, associated with the main CPU is provided for accessing a system memory 206. The second controller is represented as a separate graphics controller 208, for accessing a shared memory 210.

The shared memory 210 can be used by the system controller 204 when all of the memory space included therein is unnecessary for use by the graphics controller. Although the shared memory 210 is primarily for use by the graphics controller, the system controller, which typically is afforded higher priority in the overall system, can interrupt graphics accesses to the shared memory 210. The system controller might have been given such a priority because the shared memory includes the main central processing unit code required for the operating system platform. These interruptions can significantly degrade graphics performance, since display refresh time can be slowed considerably if multiple system controller accesses to the shared memory are requested.

For example, where the shared memory 210 is a paged memory system, the graphics controller can access a given page from that memory to update a display. If the system controller requires access to the shared memory and generates an interrupt, graphics controller access to the shared memory is temporarily discontinued. A separate page in the shared memory associated with the read or write operation of the system controller is then precharged so that the write or read operation can occur. Afterward, the graphics controller can again access the shared memory by recharging the original page which was being accessed when the system controller interrupt was received.

Because the system controller is given a high priority in accessing the shared memory, the available bandwidth for graphics controller accesses can be substantially degraded, thereby degrading graphics performance. Those skilled in the art will appreciate that bandwidth as referenced herein, corresponds to the data rate at which data memory can be accessed by the graphics controller. Because the system controller has priority access to the memory in the FIG. 2 example, substantial interruptions in graphic controller access to the shared memory can occur, thereby substantially degrading the efficiency with which the graphics controller can access the shared memory.

More particularly, if a command from the main CPU 202 is issued which involves a read or write to the shared memory 210, and if the graphics controller is busy writing to memory, the system controller interrupts the graphics controller. However, in accordance with exemplary embodiments of the present invention, such interrupts are reduced to a minimum since accesses to a given page in memory by either the system controller or the graphics controller are buffered in, for example, one of the two write buffers 108 and 114 of FIG. 1. Thus, the number of system and graphics accesses to memory are reduced, such that the number of interruptions among the two controllers for a given amount of data being either written to or read from the shared memory is reduced to a minimum.

Thus, exemplary embodiments of the present invention enhance the intelligence of the memory accesses by the graphics and system controllers. This increased intelligence is achieved by knowing the configuration of the shared memory in advance, and by configuring a buffering device with respect to the shared memory configuration. In effect, accesses to memory by either the system controller or the graphics controller are combined, or spliced together, via the use of the FIG. 1 buffers 108 and 114. The splicing is based on knowledge of which data packets can be grouped together for writing to or reading from the shared memory without significantly affecting access overhead, such as access time or latency time (that is, the time delay in performing the read or write).

In summary, exemplary embodiments control access to a memory by receiving a first memory access, the first memory access including a first memory address and first data. The first memory address is stored in a first address register, such as register 106, and first data associated with the first data packet is stored in a first write buffer, such as write buffer 108. Upon receipt of a second memory access, which includes a second memory address and second data, a comparison of the first memory address and the second memory address is provided. Where a match between the addresses of the first and second data accesses is detected, data associated with the second memory access is stored in the first memory buffer. However, if a match among at least a predetermined portion of the first memory address and the second memory address is not determined to exist, then the second memory address can be stored in a second address register such as the second register 112. Data associated with the second memory access can then be stored in a second memory buffer, such as the second write buffer 114.

Further, the detected mismatch in address can be used to initiate a transfer of the data from the first memory buffer to the shared memory. Additional memory accesses to the page address stored in the second address register are then buffered in the second memory buffer until another address mismatch is detected, at which time contents of the second memory buffer are transferred to the shared memory. This process can be repeated indefinitely.

As mentioned previously, conditions such as a full write buffer, or the initiation of a read operation can be used to initiate a transfer from either or both of the write buffers 108 and 114 to the shared memory. Alternately, as mentioned previously, a periodic transfer of data from any or all of the write buffers to the memory can be performed. Such periodic transferring can, in the FIG. 2 embodiment, be performed during a predetermined condition of a graphics display. For example, the transfer can be implemented during at least one of a vertical retrace or a horizontal retrace of a display which receives data from the shared memory.

While a read operation has been described above as one trigger for initiating a downloading of information stored in any or all of the write buffers to the stored memory, those skilled in the art will appreciate that such a transfer of data is not necessary to ensure access by the system to data stored in the write buffers. In accordance with alternate exemplary embodiments, any or all of the write buffers can be provided with addresses so that information stored therein can be read by remaining portions of the FIG. 2 system 200. For example, where the page and column address information of data stored in a given write buffer are stored, a portion of the system 200 requesting access to this data can directly address the write buffer which includes the data. This avoids any need to write information from the write buffer to the shared memory in response to the initiation of a read operation.

Those skilled in the art will appreciate that by consolidating multiple accesses to a shared memory, such as multiple word accesses of a system controller, the total number of graphics access interruptions by the system controller are reduced. Because a majority of graphics operations have a high degree of locality (i.e., data is typically written in consecutive memory locations such that multiple data packets have similar page addresses in memory), performance can be enhanced by increasing the size of a memory window within which the multiple accesses are included. Because maximum graphics performance is directly proportional to the available bandwidth, overall performance is improved since the overhead arbitration and the repeated closing and opening of memory pages (e.g., precharge costs) are significantly reduced.

Those skilled in the art will appreciate that a reduction in overhead associated with arbitration and the closing and opening of memory pages is achieved, in accordance with exemplary embodiments, by decoupling system controller access cycles from the arbitrated memory environment. Where synchronous memories are used, page and column address information can be used to optimize memory burst cycle support so that consecutive page and column locations can be buffered and then written during a single memory access. As a peripheral benefit of exemplary embodiments, overall address storage space can also be reduced since there is more efficient use of each page in the memory.

Figure 3:
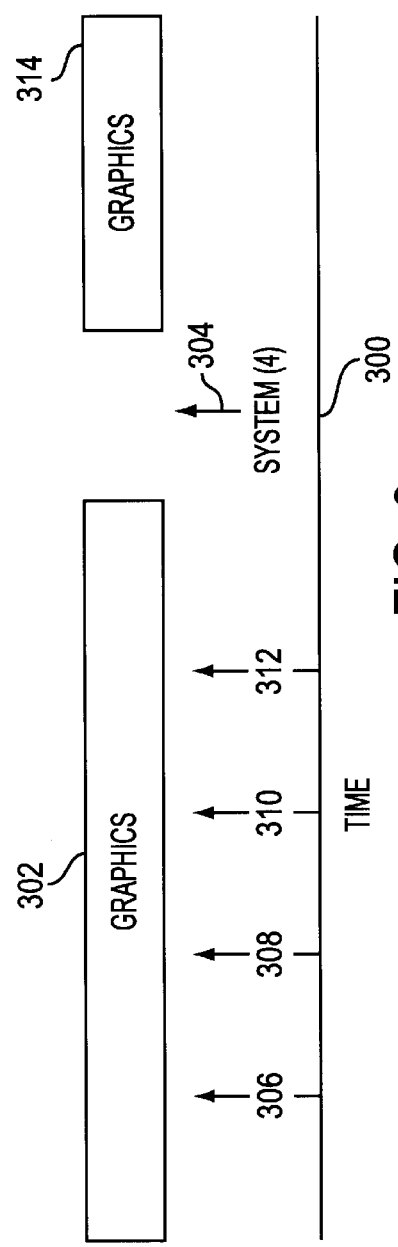
FIG. 3 illustrates how interruptions among multiple controllers accessing shared memory can be reduced in accordance with exemplary embodiments of the present invention.

Advantages of the exemplary embodiments described herein can be better understood by referring to FIG. 3. As mentioned previously, the graphics controller 208 has a first priority for accessing the shared memory 210, while the system controller 204 has a second priority for accessing the shared memory, with the second priority being higher than that of the first. As a result, system controller interrupts can substantially degrade graphics bandwidth and graphics performance. To counter the arbitration process used to control access to the shared memory, the memory access control device 100 (FIG. 1) serves as a means for splicing data of plural memory accesses by at least one of the first controller and the second controller into a single memory access.

Referring to FIG. 3, multiple accesses occur over a time shown on the x-axis 300. In the FIG. 3 example, blocks of data are being continuously supplied from the graphics controller, via the memory access control device 100, to the shared memory 210. The graphics operation 302 can be considered to represent the storage of multiple input data packets in a buffer followed by a transferring of the buffered data to the shared memory.

In FIG. 3, a system controller interrupt is generated at a time 306, associated with the first input data packet of a system memory access. However, data associated with the interrupt is not written or read from the shared memory. Rather, the system waits to determine whether subsequent read or write operations to the same page are required by the system controller. At times 308, 310 and 312, three additional interrupts associated with three data packets of the system controller are received. In accordance with exemplary embodiments of the present invention, the four system controller accesses are buffered for consolidation via the write buffer into a single system access, provided they are all accessing the same page in the shared memory. Upon a predetermined condition (such as a time-out condition, a full write buffer or any other user-configured condition), contents of the buffer are written to the shared memory, as represented by time 304 of FIG. 3.

Thus, the time required to separately precharge the same page in memory for each of the system controller accesses is eliminated, thereby substantially enhancing the efficiency of data transfer. Further, the number of interrupts to the graphics controller can be substantially reduced since the graphics controller can continue to transfer data to a given page of memory while system controller data is buffered. Afterward, the system controller can access the memory in a single data transfer to a given page of the shared memory. Because all data is transferred by the system controller to a given page and memory, the amount of time required to accommodate the additional data storage in the write buffer 108 or 114 is not significantly greater than the amount of time required to perform what would have been multiple single accesses to the same page in the shared memory. After the system controller has interrupted the graphics controller and transferred all information associated with a given page, graphics controller operation can resume as indicated by block 314 in FIG. 3. Thus, those skilled in the art will appreciate that significant advantages in time and efficiency can be achieved in accordance with exemplary embodiments of the present invention. These efficiencies can be achieved regardless of whether the memory is a synchronous memory or an asynchronous memory.

While the foregoing exemplary embodiments are provided for illustrating the advantages which can be achieved by the present invention, those skilled in the art will appreciate that numerous alternate embodiments can be implemented. For example, as described previously, any number of page/column registers can be used for any number of pages in the memory. Similarly, any number of write buffers can be used. Further, those skilled in the art will appreciate that while the block diagrams of FIGS. 1 and 2 illustrate a hardware implementation, aspects of the present invention can be equally implemented by software. For example, the page and column compare feature performed by the memory controller 102 of FIG. 1 can be implemented as either a software feature, or as a hardware feature.

Further, those skilled in the art will appreciate that while exemplary embodiments have been described with respect to buffering the memory accesses associated with a single page, and then writing the multiple accesses to a single page of the shared memory, exemplary embodiments of the present invention are not so limited. For example, multiple pages of the shared memory can be grouped such that they are precharged collectively so that buffered data packets can be written into multiple pages during a single memory access. Thus, any number of multiple data packets can be buffered for writing to or reading from the shared memory provided all memory locations involved in the read or write can be accessed without multiple overhead costs (e.g., multiple recharge operations).

In addition, those skilled in the art will appreciate that while exemplary embodiments have been described as buffering multiple data packets for storage at consecutive locations of a shared memory, it is not necessary that consecutive memory locations be used. Rather, any memory locations can be used to receive information downloaded from the buffers (such as buffers 108 and 114 of FIG. 1) provided the locations to which such information is to be downloaded are specified in advance, or supplied to the shared memory in locations having an order which is specified in advance, so that appropriate locations of the memory can be precharged before the write operation is initiated.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for controlling access to a memory, said apparatus comprising:

means for comparing at least a portion of an address of at least a first memory access and a second memory access;

means for storing said portion of said address of said first memory access;

means for buffering data of said first and second memory accesses determined by said comparing means to include said at least a portion of said address; and means for transferring said buffered data of said first and second memory accesses to a given page and column location of said memory during a single access cycle of said memory.

2. Apparatus according to claim 1, wherein said comparing means further includes:

a memory controller for comparing a row address of the first memory access with a row address of the second memory access.

3. Apparatus according to claim 2, wherein said memory controller further compares a column address of the first memory access with a column address of the second memory access.

4. Apparatus according to claim 3, wherein said memory is a synchronous memory.

5. Apparatus according to claim 1, wherein said address storing means further includes:

a first register for storing a row address of said first memory access; and a second register for storing a row address of another memory access when said comparing means determines that said row address of said another memory access does not match said row address of said first memory address.

6. Apparatus according to claim 5, wherein said buffering means further includes:

at least one buffer for storing data of said plural memory accesses which includes said at least a portion of said address.

7. Apparatus according to claim 6, wherein said buffering means further includes:

a second buffer for storing data of said another memory access when said comparing means determines that said row address of said another memory access does not match said row address of said first memory access.

8. Apparatus according to claim 7, wherein said transferring means further includes:

a multiplexer for selectively transferring data from said at least one buffer and said second buffer to said memory.

9. Apparatus according to claim 1, wherein said buffering means further includes:

at least one buffer for storing data of said plural memory accesses which includes said at least a portion of said address.

10. Method for controlling access to a memory comprising the steps of:

receiving a first memory access, said first memory access including a first memory address and first data;

storing said first memory address in a first address register and storing said first data in a first memory buffer;

receiving a second memory access, said second memory access including a second memory address and second data;

comparing said first memory address and said second memory address; storing said second data in said first memory buffer when at least a predetermined portion of said first memory address matches said second memory address; and transferring the first data and the second data from said first memory buffer to a given page and column location using a single memory access command.

11. Method according to claim 10, further comprising the step of:

storing said second memory address in a second address register and said second data in a second memory buffer when said at least a predetermined portion of said first memory address does not match said second memory address.

12. Method according to claim 11, further comprising the step of:

transferring data stored in said first memory buffer to said memory when said at least a predetermined portion of said first memory address does not match said second memory address.

13. Method according to claim 11, further comprising the step of:

transferring data stored in said first memory buffer to said memory when a memory read operation is initiated.

14. Method according to claim 11, further comprising the step of:

transferring data stored in said first memory buffer to said memory when said first memory buffer is full.

15. Method according to claim 11, further comprising the step of:

transferring data stored in said first memory buffer to said memory periodically during at least one of a vertical retrace or a horizontal retrace of a display which receives data from said memory.

16. Method according to claim 11, further comprising the step of:

reading data directly from said first memory buffer in response to a read operation.

17. Apparatus for accessing a memory comprising:

a first controller having a first priority for accessing the memory;

a second controller having a second priority for accessing the memory, said second priority being high than said first priority; and means for splicing data of plural memory accesses by at least one of said first controller and said second controller into a single memory access, and for transferring the first data and the second data to a given page and column location of said memory using a single memory access command.

18. Apparatus according to claim 17, wherein said first controller is a graphics controller which has access to said memory.

19. Apparatus according to claim 18, wherein said second controller is a system controller which shares said memory which said graphics controller.

20. Apparatus according to claim 19, wherein said memory is a synchronous memory.

* * * * *